United States Patent [19]

Knowles et al.

[11] Patent Number: 4,781,937

[45] Date of Patent: Nov. 1, 1988

[54] PRODUCTION OF REHYDRATABLE FOOD PRODUCTS

[76] Inventors: Wilfred R. Knowles, R.R. #1, Acton, Ontario, Canada, L7J 2L7; John T. Thatcher, R.R. 1, Chatham, Ontario, Canada, N7M 5J7

[21] Appl. No.: 926,018

[22] Filed: Oct. 31, 1986

[51] Int. Cl.$^4$ .......................... A23L 1/212; A23L 1/311
[52] U.S. Cl. ..................................... 426/457; 426/640; 426/646
[58] Field of Search ............... 426/457, 640, 646, 643; 159/11.1

[56] References Cited

U.S. PATENT DOCUMENTS

| | | | |
|---|---|---|---|
| 891,336 | 6/1908 | Hatmaker | 426/588 |
| 1,047,760 | 12/1912 | Davidson | 426/457 |
| 1,908,489 | 5/1933 | Sartakoff | 426/457 |
| 2,479,310 | 8/1949 | Chapin | 426/457 |
| 2,523,552 | 9/1950 | Birdseye | 426/444 |
| 2,723,202 | 11/1955 | Rivoche | 426/444 |
| 3,116,124 | 12/1963 | Eolkin | 34/36 |
| 3,201,260 | 8/1965 | Asselbergs | 426/457 |
| 4,251,550 | 2/1981 | Proctor | 426/590 |
| 4,332,832 | 6/1982 | Buckley et al. | 426/641 |
| 4,394,397 | 7/1983 | Lometillo et al. | 426/448 |
| 4,401,657 | 8/1983 | Kashiwabara et al. | 426/656 |
| 4,510,163 | 4/1985 | Gejl-Hansen | 426/241 |
| 4,590,088 | 5/1986 | Karwowski | 426/457 |

FOREIGN PATENT DOCUMENTS

| | | |
|---|---|---|
| 78750 | 12/1902 | Canada . |
| 263991 | 8/1926 | Canada . |
| 279509 | 4/1928 | Canada . |
| 312241 | 6/1931 | Canada . |
| 772582 | 11/1967 | Canada . |
| 777749 | 2/1968 | Canada . |
| 877419 | 8/1971 | Canada . |
| 885547 | 11/1971 | Canada . |
| 1041349 | 10/1978 | Canada . |

*Primary Examiner*—George Yeung
*Attorney, Agent, or Firm*—Rodman & Rodman

[57] ABSTRACT

Nutritious rehydratable dehydrated food products which contain from about 10% to 35% fat and from 15% to 60% protein, are prepared by (1) comminuting or emulsifying a mixture of edible animal matter derivable from mammals, poultry and/or fish, and vegetable matter (including starch); (2) applying a thin layer of the comminuted mixture to the heated surface of a drum dryer; and (3) cooking and dehydrating the mixture on said drum dryer surface. The food product so formed contains no more than about 11% moisture, is in flake or powder form, and is rehydratable to at least three times its dried weight.

9 Claims, No Drawings

PRODUCTION OF REHYDRATABLE FOOD PRODUCTS

This invention relates to the preparation and prodcution of cooked dehydrated rehydratable foods in flake or powdered form made principally from combined co-cooking and co-drying of fat bearing meat or meat by-products with or without added fat together with vegetables whose major dry matter ingredient is starch with or without added starch, or with cereals whose major ingredient is starch, so that the fat component is at least about 10% of the dry matter of the food. Other material to fortify and/or supplement the nutritional factros, or to preserve the characteristics of the products or adjust cosmetics, may also be added.

In the past a primary emphasis in the manfacture of dehydrated foods has been to enable ease and quickness of preparation, superior shelf life, reduction in space required for storage, and reduced distribution costs and damages.

There has been minimal focus given to the preparation of complete and/or balanced nutritional meals from only one "instant" food product.

The prior art of dehydrating rehydratable cooked materials with significant levels of protein, fat and carbohydrates have involved precooking before dehydration. The present invention is concerned with avoiding precooking of all or at least the important elements of such food compositions for taste, nutritional and visual benefits.

The present invention involves blending of comminuted foodstuffs with significant levels of fat and protein together with starch or starch bearing vegetable matter. When blended, the product efficiently drum dries and retains individual food component properties such as nutrition, flavor, color and fragrance which are highest without cooking or gelatinizing before co-cooking and co-drying of all the materials on a drum dryer.

The present invention provides for the production of foods with fat levels varying from about 10% to 35% and protein levels from 15% to 60% (dry basis). The meats are from mammals and/or poultry and/or fish. The carbohydrates and the proteins from the meats and vegetables serve as the adsorption and binding base for the fat.

In one aspect the present invention realtes in a method for the production of a nutritious rehydratable food product containing from about 10% to 35% fat and 15%–60% protein, which comprises:
  comminuting and/or emulsifying a mixture of edible animal matter and vegetable matter;
  applying a thin layer of said comminuted mixture to the heated surface of a drum dryer;
  cooking and dehydrating said mixture on said drum dryer surface to form a food product having a low moisture content and containing from about 10% to 35% fat and 15%–60% protein; said food product being rehydratable to at least three times its dried weight; and
  recovering said product.

The present invention, in another aspect, resides in a dehydrated edible animal and vegetable-matter-containing food composition in flake or powder form, and containing from about 10% to 35% by weight fat and from 15% to 60% by weight protein, said composition having a moisture content of not more than 11% and being rehydratable to at least three times its dried weight, and further characterized by having at least 10% of the original colors of each of the basic raw ingredients.

All measurements of fat and protein content in the food compositions of the present invention are on a dry matter basis.

The process of the present invention is effective without prior dehydrating or prior cooking. All ingredients may be ground, mixed, pulverized and/or emulsified together and applied raw upon a drum drier with good rehydration, nutrient content, color, flavor and fragrance and reduced costs as they are co-dried and co-cooked. The product mixture may also be preheated or partially cooked before drum application for some good rehydration, nutrition, and reduced costs vs. cooking. Preheating is best below 60° C. If the food is fully cooked as compared with preheating as mentioned above, there is a substantial breakdown in the food's ability to rehydrate, hold fat, maintain color other than beige/grey, hold nutritional values, and to maintain flavor and odor; and in addition the food tends to become pasty.

The term "rehydration", as it is used in the present specification, signifies the water holding capacity of the dehydrated food product when under contrifugation. The water holding capacity is determined by a 5 g. weight of test material (as is) placed in a preweighed 50 ml. centrifuge tube, then thoroughly wetted, and then centrifuged at 2,000×g. for 10 minutes, following which the required supernatant is discarded; and finally the centrifuge tube with test material is weighed.

Contrary to the findings of French Patent P.V. 889,306 concerning fatty meat and pre-gelatinized starch foodstuffs, the food compositions as described herein with pre-gelantinized starch before drum drying are capable of significant fat retention at temperatures well in excess of 37° C. on the drying apparatus.

With regard to the co-cooking and co-drying on the drum it has been found that as the fat level increases, the cooking action changes from baking to frying while drying change from expelling of moisture only to expelling of moisture plus fat. The excess moisture vaporized while the excess fat is rendered off mainly in liquid form. The amount of fat retention can be increased to a higher level by using more fibrous material and by preheating before drying. The increase in fat levels causes no vital loss in the rehydratability of the final dried product. No previous process that we are aware of has envisaged the use of a drum drier surface for varying forms of heat cookery which take place over the high and low ranges of fats desired.

Mammals, poultry and fish are all satisfactory sources for protein and fat. Many plant matter products may be used for carbohydrates and fiber, and also some fat and protein, with potatoes being a bland base product whereas carrots generate significant color and odor changes and have high fiber content.

The moisture level of the mixture may be reduced through use of starches, grains or meals such as fish, poultry or corn gluten meal.

The ratio of mammal to poultry to fish may be varied so that any component can make up all or none of the "meat" component. Similarly, the ratio of the "meat" to non-meat component may be varied to meet the nutritional target of about 10% to 35% fat and 15% to 60% protein. Further each mammal, poultry or fish component may be made up of meal either in part or whole or unprocessed or partly processed meat types. The use of meal reduces mash moisture for a significant increase in dryer yield. The "meat" component may be, for example, one or more of the following: fish, poultry, red meats, organ meats such as eg. liver, and meals thereof. The vegetable matter component may be at least one of the following: potatoes, carrots, beets, turnips, corn and cereal grains, but is not limited thereto.

Use of meal may be up to 25% of the pre-dried product mix but tends to detract from palatability, rehydration and other quality factors. Meal use is most effective when limited to below 10%. Other ingredients can also be added before or after the drying to improve cosmetic and/or nutritional attributes as well as rehydration rate and amount.

The resulting dried meat is in a thin sheet form which may be crumbled or further processed to flakes or powder for pakage filing. The product can be consumed in its dry form or it may be reconstituted with a liquid such as water. Acceptable reconstituted product can be achieved with liquid additions up to 5 times the dry product weight. Generally the liquid addition will be of the order of 2.5 to 3.5 times the dry product weight for a wet solid food with the addition of lesser amounts of liquid resulting in a product which is merely damp or paste like while the addition of greater amounts of liquid results in a soup-like product.

The cooking and drying may be accomplished by applying the prepared mixed product on to a single or double drum drier in a traditional manner. In the event there is a higher dry matter fat content (such as 50%) in the mixture than the final product can hold, then the excess will liquefy and run off the applicator rolls or between the drums so the process will function as a fat rendering operation for the excess fat while cooking and drying the remainder.

The clearance between the drum and applicator rolls or between drums may vary depending on the composition of the mixture and the intended final use.

For good storage with minimal need of preservatives, the moisture content should be below 11% with lower levels being more effective.

The fat retention of the product is controlled by a number of factors. These include the initial fat levels before drying, preheating before drying, the source and type of the fats, the cereal or vegetable used in the co-drying, the temperature of the drum, the speed of the drum, the length of time the product is exposed to the drying of the drum, and the amount and type of agents that might be used to increase the fat retention. The mechanisms of the fat retention include adsorption on the surface of the dried particulate material, entrapment between particles, and solidification of flakes of fat not associated with the balance of the substrate as it leaves the dryer.

The preparation and production of dehydrated and cooked food products is illustrated in the following examples, which are given by way of exemplification and are not intended to be limiting.

EXAMPLE 1

A food mixture is made up of the following parts— Whole fish 10, Fish Meal 3½, Liver 13, Chicken Necks and Backs 2, Beef Lung 7, Liver and Glandular Mean 1½, Potatoes 38.8, Carrots 10.0, Salt 0.2.

Frozen fish were ground using a Comil grinder with a 375/1000 inch screen. Lungs, carrots and chicken were ground in a Blakeslee Meat Chopper using a ⅜" perforated plate. Potatoes were washed, lightly peeled in an abrasive peeler and ground in the Comil grinder with a 187/1000 inch diameter screen. The liver was pulverized in a kitchen blender.

The above ground ingredients were mixed together in a Blakeslee Mixer for approximately 6 minutes. The mixed food slurry was slowly added to the surface of the rotating drums of a pilot scale Blaw-Knox drum drier with a steam pressure of 18 p.s.i. and drum rotation of 0.3 rev/min. and flaked product thickness set at 3/4 millimeter. Product collected from the drum drier was flaked on the Comil grinder using a 250/1000 inch diameter screen. The resulting product involved an as is moisture of 6.5% with dry matter protein of 42.7% and dry matter fat of 12.9% with a water holding capacity of 3.1. After reconstitution the product had a meaty flaky texture. Water holding capacity is determined by moisture analysis after centrifugation, and the apparent rehydration will be higher than the rehydration ratio. It is estimated that a rehydration ratio of 3.1 will be equivalent to a visual rehydration rate of 3.6.

EXAMPLE 2

The procedure of Example #1 is again followed, using 40.0% pork, 26.7% pork lung, both being passed through the Blakeslee Meat Chopper, and 33.3% potatoes. The resulting product contains 10.6% moisture and dry basis fat 33.2%, and protein 41.3%, and has a rehydration ratio of 2.1. Excess fat was rendered off the drums while cook-drying.

EXAMPLE 3

The procedure of Example 1 is followed using 246.3 parts frozen fish, 246.3 parts fish meal, 1.5 parts lard and 492.6 parts potatoes. The resulting product has 5.6% moisture and dry basis fat 10.4% and protein 44.9% and has a rehydration ratio of 2.9.

EXAMPLE 4

This involves testing of the following mixtures: (1) 83.6% potatoes, 4.4% beets and 12% margarine and (2) item (1) with 30% chicken breast pieces (meat, skin and bone added). All products were ground, then emulsified in a Stephan Micro-cut, and drum dried, with the emulsions at (a) room temperature, (b) 50° C., (c) 85° C. and (d) 100° C.

The results of the tests are tabulated as follows:

| Temp. When Applied to Drum Dryer | After Drying Measurements | 83.6% Potatoes 4.4% Beets 12.0% Margarine | (1) with 30% Chicken Breasts Added |
|---|---|---|---|
| Room Temperature | Color | bright rich red | less bright rich red |
|  | Water Rehydration | 3.18% | 2.85 |
|  | Dry Matter Fat | 17.9% | 19.1% |
| 50° C. | Color | slight color loss vs. raw | slight color loss vs. raw |
|  | Water Rehydration | 2.72 | 2.42 |
|  | Dry Matter Fat | 26.4% | 31.6% |

| Temp. When Applied to Drum Dryer | After Drying Measurements | 83.6% Potatoes 4.4% Beets 12.0% Margarine | (1) with 30% Chicken Breasts Added |
|---|---|---|---|
| 85° | Color | red lost now beige | beige slight red |
| | Water Rehydration | 2.09 | 2.08 |
| | Dry Matter Fat | 24.5% | 29.7% |
| 100° C. | Color | more beige | beige |
| | Water Rehydration | 1.75 | 1.80 |
| | Dry Matter Fat | 24.7% | 29.0% |

While water holding capacity declines as temperature of the wet foodstuff is increased prior to dehydration, fat retention is poorest from the raw foodstuff and is at its best when heated to 50° C. and then declines. The color degenerated with each added heat application and was substantial after 50° C. Much higher fat retention was achieved without heating before drum application such as in Example 2. If very high levels for both water holding capacity and fat level are sought, the optimum method includes some modest preheating of the foodstuff before drum application.

While particular embodiments of the present invention have been described hereinabove, it will be appreciated by persons skilled in the art, and will be readily apparent to such persons, that various changes and modifications may be made therein without departing from this invention. For instance, considerable variation may be made as to the choice of basic ingredients to be used in preparing the dehydrated edible food products of this invention, or in the process conditions to be used in preparing such products, or in both raw materials and process conditions. It is therefore intended that this invention not be limited only to what is specifically described and exemplified, but only by the claims which follow.

What is claimed is:

1. A method for preparing a nutritious, rehydratable food product containing about 10 to 35 weight % fat and about 15 to 60 weight % protein on a dry basis, comprising:
    (a) comminuting a mixture of uncooked edible animal matter and vegetable matter;
    (b) contacting the heated surface of a drum dryer with a thin layer of said comminuted mixture; and
    (c) cooking and dehydrating said mixture on the heated surface of said drum dryer to a moisture content of below about 11% to produce said rehydratable food product containing from about 10 to 35 weight % fat and about 15 to 60 weight % protein on a dry basis, wherein said rehydratable food product retains at least 10% of the original color of the uncooked edible animal matter and vegetable matter.

2. A method according to claim 1, wherein the outside surface of the thin layer of the comminuted mixture is maintained at a temperature of about 212° F. to 230° F., until a moisture level below about 11% if attained.

3. A method according to claim 1 wherein the vegetable and animal matter have been preheated to not more than 85° C. before drum drying is carried out.

4. A method according to claim 1 wherein the vegetable and animal matter is preheated before drum drying is effected, said preheating being such that starches in said vegetable matter are not fully gelantinized.

5. A method according to claim 1 wherein said vegetable and animal matter, before being subjected to drum drying, is either raw and unheated or is preheated to a temperature below 60° C.

6. A method according to claim 1 wherein the vegetable matter component is food starch or starch bearing cereals or vegetable so that between 15% and 75% of the dry matter is starch.

7. A rehydratable food composition comprising a mixture of dehydrated, cooked comminuted animal matter and vegetable matter in flake or powdered form, said mixture containing from about 10% to 35% by weight of fat and from about 15% to 60% by weight protein, said composition having a moisture content of not more than about 11% and being rehydratable to form a food with a meaty or flaky texture upon rehydration to about 2.5 to 3.5 times its dried weight, and wherein said food composition retains at least 10% of the original colors of the animal matter and vegetable matter forming said mixture.

8. The food composition of claim 7, wherein the color varies from red to beige.

9. A dehydrated edible food composition according to claim 7, containing at least one animal matter selected from the group consisting of fish, poultry, red meats and organ meats.

* * * * *